United States Patent [19]
Leveraus

[11] 3,790,931
[45] Feb. 5, 1974

[54] FILTER BYPASS WARNING CIRCUIT ON A MOTOR VEHICLE

[75] Inventor: James E. Leveraus, Milwaukee, Wis.

[73] Assignee: Allis-Chalmers Corporation, Milwaukee, Wis.

[22] Filed: June 30, 1972

[21] Appl. No.: 268,061

[52] U.S. Cl. .............................. 340/60, 340/239 F
[51] Int. Cl. ......................................... G08b 21/00
[58] Field of Search ....... 340/52 R, 52 F, 60, 239 F, 340/243

[56] References Cited
UNITED STATES PATENTS

| | | | |
|---|---|---|---|
| 3,644,915 | 2/1972 | McBurnett | 340/239 F |
| 3,073,451 | 1/1963 | Stephenson | 340/239 F UX |
| 3,127,586 | 3/1964 | Heyn et al. | 340/60 |
| 2,810,034 | 10/1957 | Grant | 340/239 F X |
| 3,070,676 | 12/1962 | Moseres | 340/239 F X |
| 3,505,791 | 4/1970 | Breslin | 340/239 F X |

FOREIGN PATENTS OR APPLICATIONS 345,440  3/1931  Great Britain .................. 340/239 F

*Primary Examiner*—Alvin H. Waring
*Attorney, Agent, or Firm*—Arthur L. Nelson

[57] ABSTRACT

An electric warning circuit operated by a filter bypass valve operating as a switch.

10 Claims, 1 Drawing Figure

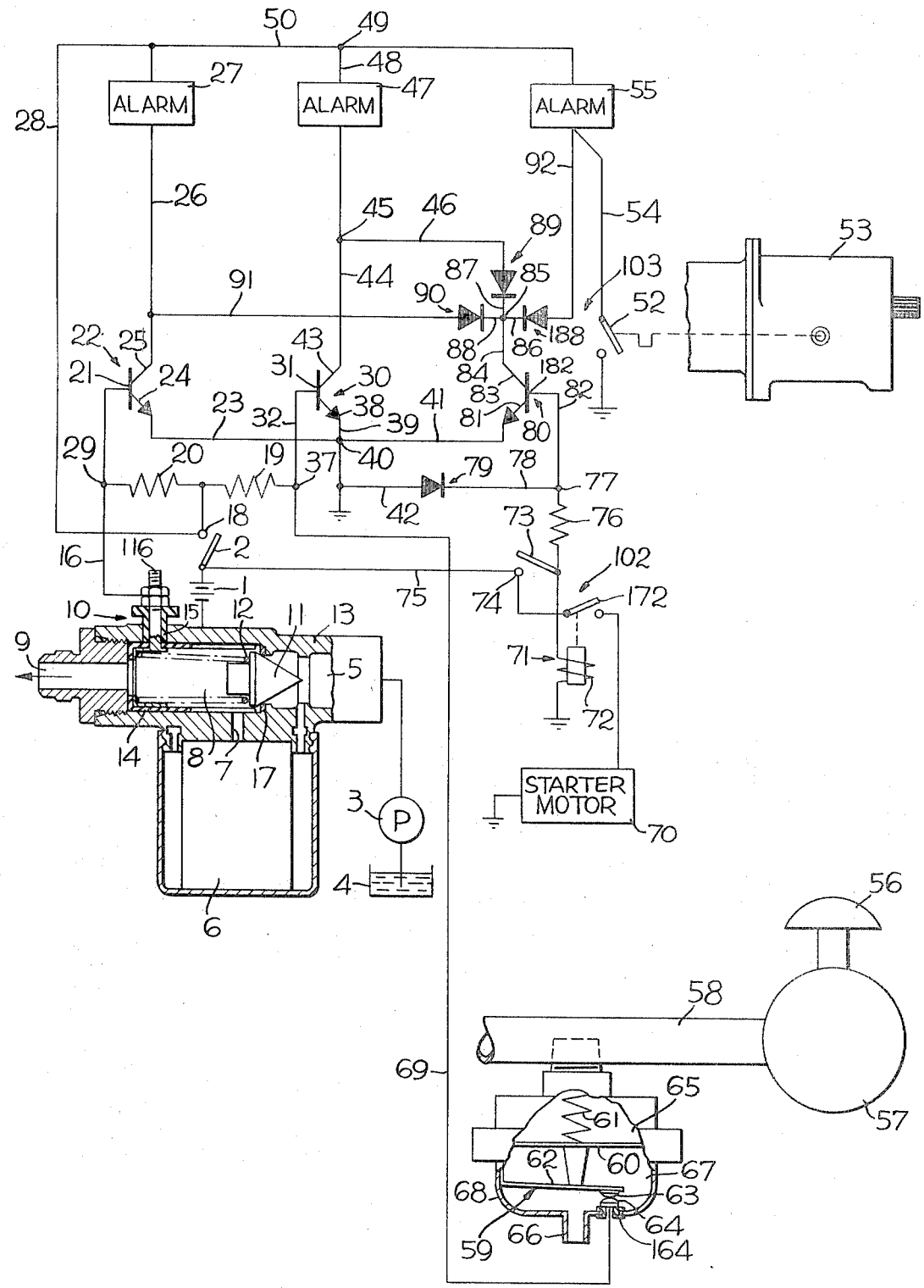

FILTER BYPASS WARNING CIRCUIT ON A MOTOR VEHICLE

This invention relates to a warning indicator and more particularly to an electric alarm circuit operated by a filter bypass valve operating as a switch to control the flow of current through the alarm.

Hydraulic fluid systems used to operate auxiliary equipment on a vehicle and hydraulic lubricating systems for maintaining lubrication of an engine require filtering means to maintain the hydraulic fluid in the system free of contamination such as abrasive material and corrosive substances if the hydraulic system is to operate properly. This is particularly true in the lubrication system where purification of the oil supply is fundamental in assuring long engine life. Accordingly, a filter is positioned in the hydraulic fluid system and it is conventional to use a bypass valve to bypass the hydraulic fluid around the filter in event the filter becomes contaminated and cannot transmit sufficient hydraulic fluid through the filter for the needs of the system. It is desirable to have some indication to warn the operator when the filtering of the system is not operating properly. Accordingly, this invention provides means in connection with the bypass valve which operates as a switch in a warning circuit to indicate to the operator the presence of a defective filter.

The alarm is normally in the off position and is energized to indicate the defective filter. The alarm in the warning circuit may be any visible or audible signal to indicate the presence of the defective filter. The circuit is such that the current normally does not energize the alarm since only a small amount of current flows through the control circuit. When the bypass valve opens, the bias control circuit causes the current to flow through the alarm and thereby indicate to the operator the presence of a defective filter.

It is an object of this invention to provide a warning to the operator of the vehicle having a hydraulic fluid system when a defective filter is present in the system.

It is another object of this invention to provide a filter bypass valve in a hydraulic system to operate as a switch for controlling the energization of an alarm indicating to the operator the presence of a defective filter.

It is a further object of this invention to provide an electrical warning circuit having an alarm to indicate a defective filter in a hydraulic fluid system, a defective air filter in an air cleaner system, or overheating of the transmission on a vehicle.

It is a further object of this invention to provide a warning indicator for indicating when a defective filter is present in a filtering system of a vehicle and also a test circuit which automatically tests the operativeness of the warning indicator at the time the vehicle is being started.

The objects of this invention are accomplished by connecting an alarm in series with a current flow control means such as the transistor across a source of electrical energy. The bias on the current flow device is controlled in response to opening and closing of the filter bypass valve. The filter bypass valve operates in response to the presence of a defective filter which will not permit adequate oil to flow through the filter; consequently, allowing the pressurized fluid to bypass the filter and flow through the valve. The opening of the valve which operates as a switch in the bias circuit will raise the potential of the control element of the current flow control means and permit current flow through the alarm. This arrangement uses a minimum of current when the alarm is inoperative and allows current flow only when a defective filter is present.

The preferred embodiment of this invention is illustrated in the attached drawings.

The drawings illustrate a hydraulic fluid filter alarm circuit, and an air cleaner alarm circuit, together with a thermally operated transmission switch operating an alarm.

Referring to the drawings, the battery 1 is connected between ground and the main switch 2. The main switch 2 energizes the alarm circuits when closed. A hydraulic system includes the pump 3 which is driven by suitable means and receives hydraulic fluid from the reservoir 4. The pump delivers pressurized fluid through the inlet chamber 5 and around the filter 6. The fluid passes through the filter 6 and is delivered through passage 7 to the valve chamber 8 and flows through the outlet conduit 9 to provide purification of oil for lubrication or use in auxiliary equipment, as required by the hydraulic fluid system.

The bypass valve 20 includes a valve element 11 connected to the spring 12 which is insulated from the housing 13. The insulated spring support 14 and the terminal insulator 15 insulate the spring 12 and terminal 116 from ground. The valve element 11, however, when in the closed position on the valve seat 17 grounds the conductor 16. When the valve element 11 is biased to an open position by a pressurized fluid in the chamber 5, the conduit 16 is no longer at ground potential.

The battery 1 is connected through switch 2 to the terminal 18 which is connected intermediate the resistors 19 and 20. The resistor 20 is connected to the conductor 16 at connector 29 which in turn is connected to the base 21 of the transistor 22. The emitter 24 of transistor 22 is connected to the conductor 23 which in turn is connected to ground. The collector 25 of transistor 22 is connected to the conductor 26. The alarm 27 is connected between conductor 26 and conductor 28 which in turn is connected to the terminal 18.

Resistor 19 is connected between terminal 18 and the junction 37 of conductor 32 which in turn is connected to the base 31 of transistor 30.

Transistor 30 has an emitter 38 which is connected to the conductor 39. Conductor 39 forms a junction 40 with conductor 23. Junction 40 is also connected to conductor 41 and conductor 42 and ground.

The transistor 30 includes a collector 43 connected to junction 44. Conductor 44 forms a junction 45 with conductor 46. Conductor 44 is also connected to the alarm 47. Alarm 47 is connected through the conductor 48 to the junction 49, and conductor 50 is connected through conductor 28 to the terminal 18.

A thermal switch 52 is mounted on the transmission 53 and is normally open. When excessive temperatures are present on the transmission 53, the thermal switch 52 closes placing the conductor 54 at a ground potential. The conductor 54 is connected through the alarm 55 and conductors 50 and 28 to terminal 18. It is understood that the alarm may be any suitable indicator. A visible alarm, for example may be a lamp; or an audible alarm, for example, a bell or buzzer to indicate to the operator a defective condition.

The air cleaner system includes a suitable inlet vent 56 supplying air to the air filter 57 which in turn is connected to the conduit 58. Conduit 58 is adapted for connection to the intake manifold of the engine. A vacuum switch 59 includes a diaphragm 60, biased by the spring 61 to force the contact arm 62 downwardly to make contact between contacts 63 and 64. When the vacuum in the conduit 58 is sufficient, the diaphragm moves upwardly raising the contact arm 62 in response to a vacuum in chamber 65 and because of atmospheric pressure present in the inlet 66 to the air chamber 67. The contact 64 is insulated from the housing 68 by insulator 164 and is connected to the electrical conductor 69 which in turn is connected to the junction 37. Arm 62 and contact 63 are connected to ground.

The starter motor 70 is controlled by a starter solenoid 71. The starter solenoid includes the coil 72 connected to ground and to switch 73. Switch 73 engages the contact 74 connecting the solenoid coil 72 through the conduit 75 to the battery 1 for energizing of the coil. This in turn operates the solenoid switch 172 and starter motor for cranking the engine. The starter circuit is connected through resistor 76 to junction 77 and conduit 78 through diode 79 to the air cleaner warning circuit. In conjunction with the starter circuit, is connected the test circuit which tests each of the alarms 27, 47 and 55 when the starter circuit is energized. The test circuit consists of the transistor 80 having its emitter 81 connected to the conductor 41 and its base 182 connected to conductor 82 and junction 77. The collector 83 is connected to the conductor 84. Conductor 84 is connected through junction 85 to conductor 86, 87, 88. The conductor 86 is connected to the diode 188 while conductor 87 is connected to the diode 89 and conductor 88 is connected to diode 90. Diode 90 is connected through the conductor 91 and conductor 26 to alarm 27. Diode 89 is connected through the conductor 46, junction 45, and conductor 44 to the alarm 47 while the diode 188 is connected through the conductor 92 to the alarm 55. When the starter circuit is energized a transistor 80 conducts current and the diodes 188, 89 and 90 all conduct current through the alarms 55, 47, 27, respectively, thereby providing a test circuit to indicate whether or not the alarms are operative. This assures the operator that the circuit is in operating condition.

The operation of the circuit will be described in the following paragraphs.

When the hydraulic system is in normal operating condition then the filter 6 is operating satisfactorily, the bypass valve 10 is in the closed position. The valve operates as a switch to connect the lower side of the resistor 20 which in turn is in connection with the base of the transistor 22 to ground when in the closed position. Accordingly, when the base of the transistor 22 is at ground the transistor is shut off.

When the filter 6 is defective and fails to transmit sufficient fluid the bypass valve opens and the junction 29 is raised to the potential of the contact 18 or battery potential and the transistor 22 conducts. When the transistor 22 conducts current, alarm 27 is energized and a signal is given to the operator that the filter is defective. Accordingly, the operator replaces the defective filter and restores the normal operating condition of the hydraulic system.

Similarly, the air filter system warning circuit operates in essentially the same manner. When the air filter 57 is operating normally and is filtering the intake air supply to the intake manifold of the engine, the vacuum in the conduit 58 and chamber 65 is relatively low as compared to when the filter 57 is not operating normally and a high vacuum is drawn in the chamber 65. An increase in vacuum in chamber 65 causes diaphragm 60 to open the switch 59.

It is understood that prior to opening of switch 59 the junction 37 connected to resistor 19 is at ground potential and correspondingly placing the base 31 of the transistor 30 at ground potential. Accordingly, the transistor 30 is not conducting current and the alarm 47 is not energized. When the switch 59 opens this places the junction 37 and the base 31 of transistor 30 at the battery potential. Accordingly, the transistor 30 conducts current and the alarm 47 is energized which indicates to the operator the air filter 57 in the air cleaner system is defective. The operator accordingly replaces the filter and the air cleaner system again operates normally and the alarm 47 is de-energized.

If either the conductors 16 or 69 and the connection to ground through bypass valve 10 or switch 59 is defective this would also give a warning, thus insuring confidence in the warning system.

The thermal switch 52 mounted on the transmission 53 as normally open. When excessive heat is developed by the transmission, the thermal switch 52 closes and the alarm 55 is energized. The reason for the overheating of the transmission 53 may be determined and corrected and the transmission again returns to its normal temperature and the thermal switch 52 again returns to the open position and the alarm 55 is de-energized.

The starter switch 73 is normally open. The starter switch energizes the solenoid coil 72 which operates the starter solenoid to engage the starter gear not shown and close the circuit to operate the starter motor 70. The operation of the starter motor is conventional, however, connected to the starter circuit 102 is the test circuit 103. The test circuit 103 includes the diode 79 which prevents damage to the transistor 30 from an excessive voltage spike when the starter switch is returned from the start position.

Normally the current from the starter circuit energizes the test circuit and a voltage is supplied to the junction 77 which places a positive bias on the base of the transistor 80. Accordingly, the transistor 80 then conducts and current flows through each of the diodes 188, 89 and 90. With the current flowing through the diodes 188, 89 and 90 the alarms 55, 47 and 27 are energized to indicate to the operator that they are operative. When the starter circuit is de-energized the test circuit is also de-energized and the alarms automatically turn off.

The embodiments of the invention in which an exclusive property or privilege is claimed are defined as follows:

1. An electric warning circuit comprising, a hydraulic fluid system including a source of pressurized fluid, a fluid filter and normally closed bypass valves operating as an electric switch in said system, an alarm, a source of electrical energy, a current flow control means connected in series with said alarm for controlling the flow of current through said alarm, a bias circuit connected to said current flow control means and said source of electrical energy including said bypass valve operating as a switch to bias said current flow control means for conduction and energization of said alarm when said valve is in the open position, a starter circuit including a starter switch, a test circuit including a transistor having its emitter connected to ground, a resister connected between the base of said transistor and said starter circuit, a diode connected to said alarm, means connecting the collector of said transistor to said diode to test said alarm when said starter circuit is energized.

2. An electrical warning circuit as set forth in claim 1 wherein said current flow control means comprises a second transistor controlling the flow of current through said alarm.

3. An electrical warning circuit as set forth in claim 1 wherein said flow control means comprises a second transistor, means for connecting said alarm in series with said second transistor across said source of electrical energy, said bypass valve operating as the switch connecting the base of said second transistor to ground when said valve is closed.

4. An electrical warning circuit as set forth in claim 1 wherein said bias circuit includes a resistor connected in series with said valve operating as a switch across said source of electrical energy, means defining the junction between said switch and said resistor for connection to the base of said second transistor to normally apply ground potential to said second transistor to prevent conduction through said second transistor when said switch is closed.

5. An electrical warning circuit as set forth in claim 1 wherein said current flow control means comprises a second transistor, said bias circuit includes a resistor connected in series with said valve operating as a switch across said source of electrical energy, means defining a junction between said resistor and said valve and means connecting said junction to the base of said second transistor, means insulating a valve element of said valve from ground thereby raising the base potential of said second transistor allowing said second transistor to conduct current and energize said alarm when said valve is open.

6. An electrical warning circuit as set forth in claim 1 comprising means defining an air filter and an air intake passage, an air pressure switch operating responsive to air pressure in said passage, a second alarm, a second current flow control means connected in series with said second alarm across said source of electrical energy, a second bias circuit connected to said second current flow control means and said source of electrical energy including said air pressure switch to control the bias on said second current flow control means for conduction of current through said second current flow control means and energization of said second alarm when said air pressure switch is open.

7. In an electrical warning circuit as set forth in claim 1 including a second alarm, a thermal switch connected to a transmission of the vehicle, said thermal switch operating to close when said transmission is overheated to thereby operate said second alarm to indicate to the operator an overheated condition of said transmission.

8. An electrical warning circuit as set forth in claim 1 including a second alarm, a second transistor connected in series with said second alarm across said source of electrical energy, a bias circuit for controlling the flow of current through said second transistor, a second diode connected in series with said second alarm, and said first transistor across said source of electrical energy, said starter circuit being connected to the base of said first transistor to conduct current through said first and second alarms when said starting circuit is energized.

9 An electrical warning circuit as set forth in claim 6 wherein said second current flow control means comprises a second transistor controlling the flow of current through said alarm.

10. An electrical warning circuit as set forth in claim 1 wherein said flow control means comprises a second transistor, means connecting said second alarm in series with said second transistor across said source of electrical energy, a resistor and said switch connected in series across said source of electrical energy and in parallel with said second current flow control means and said second alarm, means defining a junction between said resistor and said switch connected to the base of said second transistor to thereby ground the base of said second transistor when said switch is closed.

* * * * *